Figure 1:
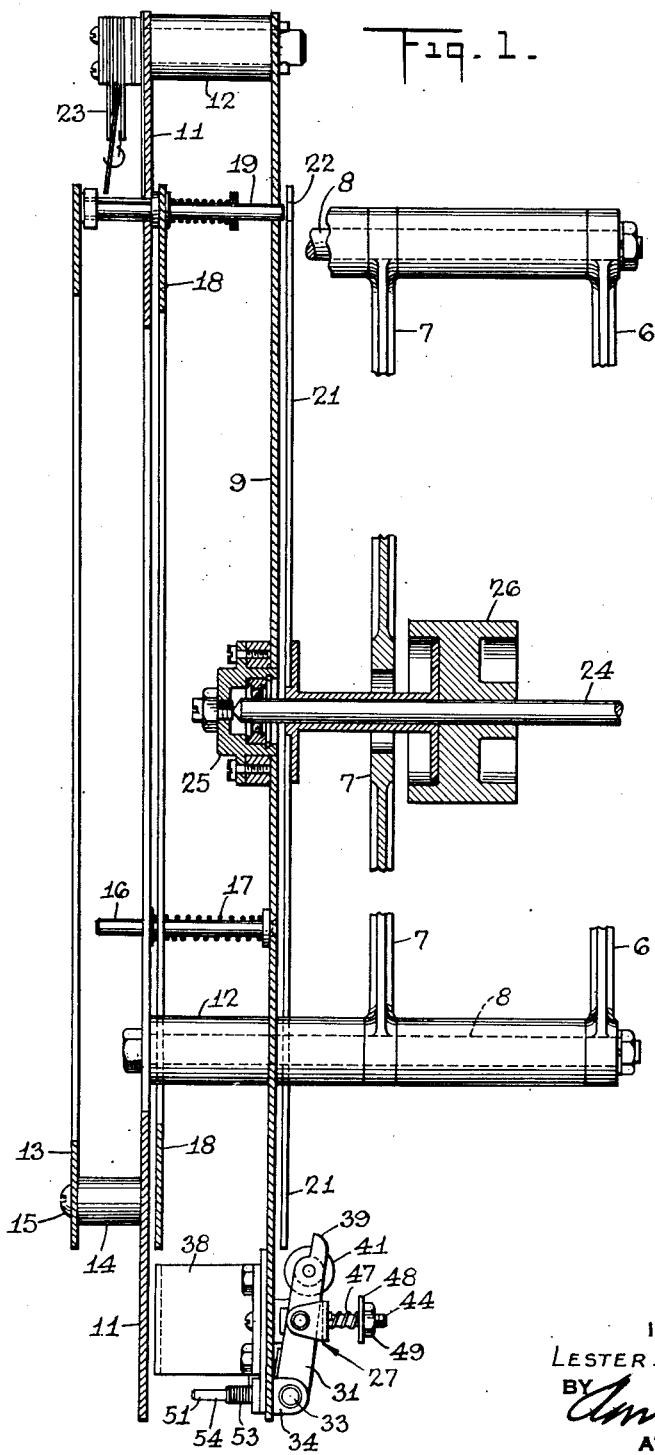

April 14, 1953　　　L. D. SINGLETON　　　2,634,965
LOCKING MECHANISM

Filed June 17, 1946　　　　　　　　　　2 SHEETS—SHEET 1

INVENTOR
LESTER D. SINGLETON
BY
ATTORNEY

April 14, 1953 L. D. SINGLETON 2,634,965
LOCKING MECHANISM
Filed June 17, 1946 2 SHEETS—SHEET 2
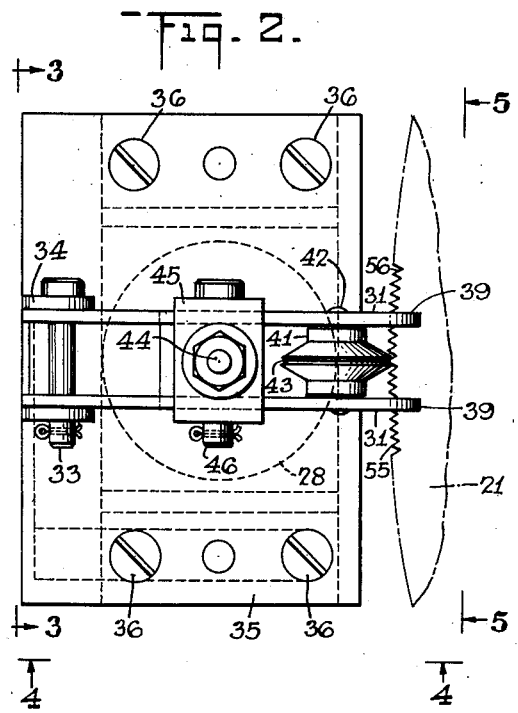
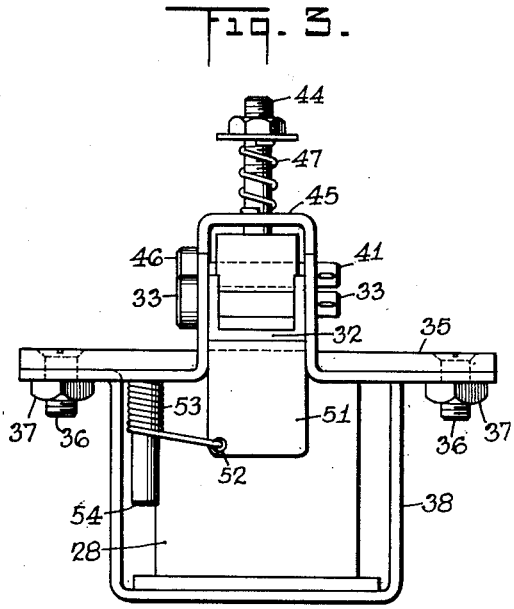
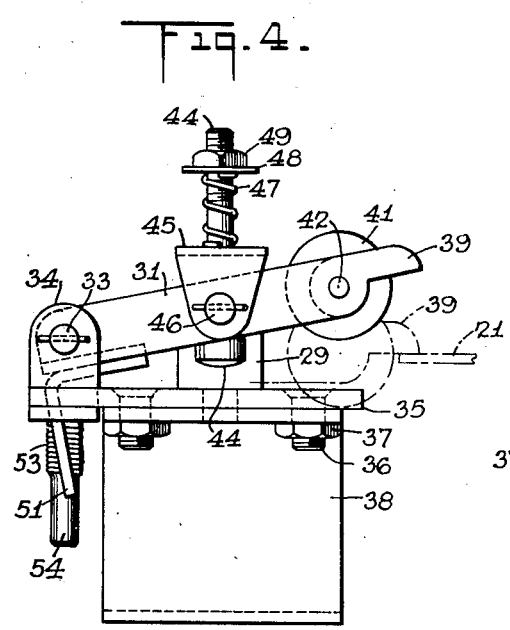
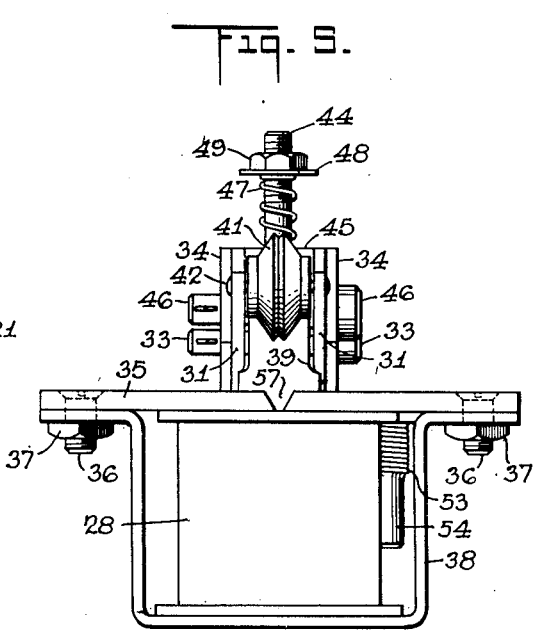
INVENTOR
LESTER D. SINGLETON
BY
*Emmy Price*
ATTORNEY Patented Apr. 14, 1953

2,634,965

UNITED STATES PATENT OFFICE 2,634,965

LOCKING MECHANISM

Lester D. Singleton, Rutland, Vt., assignor to The Howe Scale Company, a corporation of Vermont Application June 17, 1946, Serial No. 677,221

4 Claims. (Cl. 265—5)

This invention relates to a locking mechanism, and relates more particularly to a locking mechanism for the selector disc of a weighing scale provided with means for recording the weight of the load.

In a weight recording scale of the type referred to there is provided a selector disc which is mounted on the pointer shaft for rotation therewith to a position corresponding to the weight of the load on the scale platform or other load support. Means are normally provided for locking the selector disc firmly in position during a weight recording operation.

It is an object of this invention to provide a novel mechanism for locking the selector disc against rotational movement during a weight recording operation, which will be simple in construction, efficient in operation and economical in cost.

Another object of this invention is the provision, in a locking mechanism for a selector disc, of a pivoted latch member.

A further object of this invention is to provide a latch member, for locking the selector disc against rotational movement during a weight recording operation, which is itself locked against lateral movement during the said operation.

Other objects of this invention, together with certain details of construction and combinations of parts, will appear from the following detailed description.

In the drawings, wherein a preferred embodiment of this invention is shown,

Fig. 1 is a side elevational view, partly in section and partly broken away, of a dial head mechanism of a weight recording scale, showing the locking mechanism of this invention in position, Fig. 2 is a top plan view of locking mechanism of this invention, Fig. 3 is a rear elevational view of the locking mechanism of this invention, taken on line 3—3 in Fig. 2, Fig. 4 is a side elevational view of the locking mechanism of this invention, taken on line 4—4 in Fig. 2, and Fig. 5 is an elevational view of the locking mechanism of this invention, taken on line 5—5 in Fig. 2.

Like reference numerals indicate like parts throughout the several views of the drawings.

Referring to Fig. 1 of the drawings, the reference numeral 6 indicates the front framework of a scale dial head mechanism and reference numeral 7 the rear framework. In frameworks 6 and 7 are supported studs 8 on which elements of the weight recording mechanism are mounted. Such elements as are here shown comprise bottom plate 9, top plate 11, which are relatively fixed and are separated by spacers 12. A pin stop plate 13, annular in form, is separated from top plate 11 by spacers such as spacer 14 but attached thereto by screws such as screw 15. The bottom plate 9 carries a plurality of dowel pins, such as dowel pin 16, on which is mounted for movement relative thereto, and against the action of spring 17 on each dowel pin, a pin actuating plate 18. The pin actuating plate 18 is adapted to be moved to actuate locating pins 19 which are movably supported in bottom plate 9 and top plate 11. The locating pins 19 cooperate with selector disc 21 provided with openings 22, predeterminedly arranged in said selector disc, through which the locating pins selectively pass to throw certain switches, such as single pole, snap action switch 23, to actuate certain elements of the recording mechanism. The foregoing selecting elements of the recording mechanism is described in greater detail in application Ser. No. 753,473, filed June 9, 1947, now Patent No. 2,577,820, granted December 11, 1951.

The selector disc 21 is suitably mounted on pointer shaft 24 which is journaled in anti-friction bearings such as bearing 25. The pointer shaft 24 also has mounted thereon pointer drum 26 which is rotated by the load being weighed through suitable load offsetting or counter-balancing means, as is well-known in the art.

To hold the selector disc 21 firmly in position during a recording operation, there is provided a locking mechanism generally indicated in Fig. 1 by reference numeral 27. The locking mechanism is there shown mounted on bottom plate 9.

Referring to Figs. 2 to 5, the reference numeral 28 indicates a solenoid which is adapted to be electrically connected to a switch (not shown) which also functions to set the recording mechanism in operation. The electrical connections between the switch and the solenoid and the recording mechanism are such that there is a short time lag between the energization of the solenoid and the energization of the means for operating the recording mechanism whereby the selector disc 21 is locked just before the locating pins 19 are pressed toward the selector disc by pin actuating plate 18.

Solenoid plunger or core 29 is operatively connected to arms 31 of U-shaped latching member 32. The rear or joined ends of arms 31 are pivoted on a bolt 33 passing through suitable openings therein, the bolt 33 being journaled in bearing standards 34 suitably fixed to a cover-plate 35 bolted by means of bolts 36 and nuts 37 to a supporting framework 38. The front or free ends of arms 31 are cut away to form fingers 39, the purpose of which will be hereinafter set forth. A latching wheel 41 is rotatably mounted on a pin 42 carried in arms 31 in such a manner as to permit slight lateral movement thereof on pin 42. The latching wheel is substantially wedge-shaped and is provided with a wedge-shaped circumferential groove 43.

Shock absorbing means are provided to cushion the downward stroke of arms 31 when pulled down by the energization of the solenoid, said means comprising a bolt 44 loosely carried in a shackle 45 which is pivotally mounted on a bolt 46 passing through suitable openings in arms 31. A spring 47 is carried by bolt 44, which spring is retained in position on the bolt by means of a washer 48 and nut 49. For returning arms 31 to inoperative position, and thus removing latching wheel 41 from selector disc 21, there is provided a depending tongue 51 suitably fixed to the base of the U-shaped latching member 32. The tongue 51 is aperturated at 52 to receive one end of a torsion spring 53 the convolutions of which are carried on a stud 54.

When the solenoid 28 is energized by the throwing of the switch for operating the recording mechanism, the plunger 29 is lowered, pulling arms 31 downwardly about their pivot. Thus the latching wheel 41 approaches the selector disc 21 on an arc to engage a tooth 55 or enter a notch 56 in the selector disc 21. The latching wheel in operative position, that is, in selector disc holding position for the recording operation, also enters a wedge-shaped groove 57 in plate 35 thus preventing lost motion, and the fingers 39 press against selector disc to hold the same more firmly.

The latching wheel moving into engagement with the selector disc in an arcuate path meets the selector disc in a point-to-point relationship, that is, there is very little surface contact between the latching wheel and selector disc. This and the fact that the latching wheel is permitted slight lateral movement makes for a true and instantaneous locking engagement during each locking operation.

The provision of circumferential groove 43 in the locking wheel 41 permits of the use of both teeth 55 and notches 56 in the selector disc as locking elements, each tooth and each notch corresponding to a particular indication on the chart. This arrangement reduces by half the number of notches or teeth necessary to be cut in the selector disc. Thus, where the capacity of the scale is one thousand pounds by one pound it is only necessary to cut five hundred notches in the selector disc rather than the one thousand heretofore required, the teeth making up the other five hundred locking positions.

While the locking mechanism has been shown and described herein in connection with the locking of a selector disc of a weight recording device for use in scale, it will be appreciated that it may be employed generally for the locking of elements against movement.

The embodiment of my invention shown herein is to be considered merely as illustrative as the invention is susceptible to variations, modification and change within the spirit and scope of the appended claims.

What I claim as new and desire to secure by Letters Patent is:

1. A latching mechanism for a selector disc of a weighing scale having a frame, wherein said selector disc is rotatable to a position corresponding to the weight of the load on the scale platform, a solenoid carried by said frame, a solenoid plunger operated by said solenoid, a swinging latching member connected to said plunger, and a latching wheel carried by said latching member, the latching member being provided with finger extensions adapted to contact and hold the disc more firmly.

2. A latching mechanism for a selector disc of a weighing scale having a frame, wherein said selector disc is rotatable to a position corresponding to the weight of the load on the scale platform, a solenoid carried by said frame, a solenoid plunger operated by said solenoid, a swinging latching member connected to said plunger, and a latching wheel carried by said member, the latching member being provided with a spring-actuated shock-absorbing means.

3. A latching mechanism for locking the serrated selector disc of a weighing scale, said mechanism including a solenoid, a U-shaped bracket carrying said solenoid, a double-spaced swinging arm forming a U-shaped latching member, a solenoid plunger core carried by said swinging arms, a double-edged latching wheel having slight lateral movement rotatably carried on the ends of said double arm, said wheel upon downward movement of the double arm engaging the serrated disc, and arm extensions on said double arm to contact and hold said disc steady while locked.

4. The mechanism of claim 3, in which the solenoid is provided with a mounting plate positioned between the solenoid and the double arm and said plate being provided to receive the edge of the wheel when in locked position.

LESTER D. SINGLETON.

References Cited in the file of this patent

UNITED STATES PATENTS

| Number | Name | Date |
|---|---|---|
| 1,498,940 | Wheeler | June 24, 1924 |
| 1,588,642 | Wright | June 12, 1926 |
| 1,988,072 | Depenbrock | Jan. 15, 1935 |
| 2,036,081 | Rast | Mar. 31, 1936 |
| 2,092,448 | Foote | Sept. 7, 1937 |
| 2,111,127 | Rast | Mar. 15, 1938 |
| 2,283,149 | Munson | May 12, 1942 |
| 2,286,196 | Butler | June 16, 1942 |